United States Patent [19]

Smith et al.

[11] 3,712,075
[45] Jan. 23, 1973

[54] APPARATUS FOR PERFORMING THE IMMISCIBLE REFRIGERANT FREEZE PROCESS FOR PURIFYING WATER

[75] Inventors: Michael John Stapley Smith, Boars Hill; John Henry Wilson, Stochport; Bryan Reginald Parr, Sale, all of England

[73] Assignee: United Kingdom Atomic Energy Authority, London, England

[22] Filed: Dec. 18, 1970

[21] Appl. No.: 99,332

[30] Foreign Application Priority Data

Dec. 30, 1969    Great Britain.....................63,404/69

[52] U.S. Cl. ........................................62/123, 62/58
[51] Int. Cl. .................................................B01d 9/04
[58] Field of Search ....................62/58, 123; 23/273

[56] References Cited

UNITED STATES PATENTS

| 3,364,690 | 1/1968 | Torobin | 62/123 X |
| 3,243,968 | 4/1966 | McKay | 62/58 |
| 3,240,024 | 3/1966 | Ashley et al. | 62/58 |
| 3,478,531 | 11/1969 | Karnofsky | 62/123 |
| 3,486,848 | 12/1969 | Hendrix | 62/58 |

FOREIGN PATENTS OR APPLICATIONS

| 989,866 | 4/1965 | Great Britain | 62/58 |

OTHER PUBLICATIONS

Freeze–Desalting Route Set for Federal Program, "Chemical Engineering" 12/10/62, pp. 78–82.
Desalting Water by Freezing, by A. E. Snyder Scientific American 12/1962 pp. 41–47.

*Primary Examiner*—Meyer Perlin
*Assistant Examiner*—Ronald C. Capossela
*Attorney*—Larson, Taylor & Hinds

[57] ABSTRACT

Plant for performing the immiscible refrigerant freeze process for purifying water has a crystallizer section with two sub-sections. The first sub-section forms a refrigerant injection zone in which ice crystal slurry is produced. The second sub section forms a disengagement zone in which entrained refrigerant is removed from the slurry and ice crystals are allowed to grow before transferring the slurry to the brine separating and washing section of the plant.

12 Claims, 5 Drawing Figures

APPARATUS FOR PERFORMING THE IMMISCIBLE REFRIGERANT FREEZE PROCESS FOR PURIFYING WATER

BACKGROUND OF THE INVENTION

This invention relates to apparatus for use in reducing the impurity content of impure water by the immiscible refrigerant freeze process. Such impure water includes saline water, e.g. sea water which usually contains between 32 and 38 thousand parts per million of dissolved inorganic salts, contaminated or polluted river water, and municipal sewage secondary effluent, i.e., the liquid effluent from a mechanical and biological sewage treatment process. However, in the case of contaminated or polluted river water and municipal sewage secondary effluent, it may be necessary to include pre- or after-treatment in addition to the said freeze process.

The immiscible refrigerant freeze process broadly comprises boiling the immiscible refrigerant in the impure water to be treated, separating the ice crystals so produced, and melting the ice crystals to produce water purified to an acceptably low inorganic salt concentration. The latter will vary according to the intended use of the purified water: for drinking purposes an inorganic salt concentration of less than 500 ppm and preferably of the order of 200 ppm is generally required, whilst for agricultural irrigation purposes, a higher concentration may be acceptable.

SUMMARY OF THE INVENTION

According to the present invention, plant for use in reducing the impurity content of impure water by the immiscible refrigerant freeze process, includes a crystallizer section for producing ice crystals by boiling said immiscible refrigerant in said impure water, characterized in that said crystallizer section has a first sub-section forming at least one injection zone having provision for injection of said refrigerant into impure water therein to produce an ice crystal slurry, a second sub-section forming at least one disengagement zone having no provision for injection of said refrigerant but allowing removal of droplets of refrigerant entrained in ice crystal slurry therein, means for feeding impure water to the first sub-section and means for transferring ice crystal slurry produced in the first sub-section to the second sub-section.

Preferably said sub-sections operate at similar pressures. Furthermore, it is preferable to provide means for removing or assisting in removing entrained droplets or refrigerant from said slurry in the second sub-section and such means may consist of agitators for said slurry. Said agitators conveniently further serve to provide good distribution of the ice crystals in the mother liquor. Jets, such as produced by a pump to recirculate a fraction of the product slurry, are a preferred means of providing this agitation.

The first sub-section is preferably constructed to provide a continuous circular flow path for the ice crystal slurry produced therein, and means are preferably provided for inducing a flow pattern in said sub-section which includes at least a component of flow along the said flow path. Such flow-inducing means is conveniently provided by the means for feeding impure water to the first sub-section, by providing the latter with a plurality of tangentially directed injection nozzles through which the impure water is fed. Additionally, the provision for injection of immiscible refrigerant may be arranged so as to induce another flow component, such that the combined effect of the water feed and refrigerant injection produces a mixing flow pattern, for example a helical flow pattern around an annulus of the zone.

The means for transferring ice crystals slurry from the first subsection to the second sub-section may employ gravity with the first sub-section disposed at a higher level than the second sub-section. Thus, the (or each) injection zone may be disposed above a corresponding disengagement zone, and said means for transferring ice crystals slurry consist of at least one overflow duct connecting the respective zones. In a preferred construction, that part of the (or each) overflow duct which is disposed in the or the respective injection zone has an annular jacket surrounding it, input water being fed to said jacket, and the jacket having tangentially directed outlet apertures.

Conveniently the crystallizer section may be disposed in part of a single process vessel, in other parts of which are disposed means for separating ice crystals from mother liquor, means for washing said crystals, and means for melting said crystals and collecting the purified water so obtained.

Where more than one injection zone is provided, the injection zones may be connected in series or in parallel. Likewise where more than one disengagement zone is employed, these may be connected in series or in parallel, and any suitable connection combination of injection zones with disengagement zones may be provided.

DESCRIPTION OF THE DRAWINGS

Two embodiments of the invention will now be described, by way of example, with reference to the accompanying diagrammatic drawings, in which.

DESCRIPTION OF THE PREFERRED EMBODIMENTS

Figure 1:
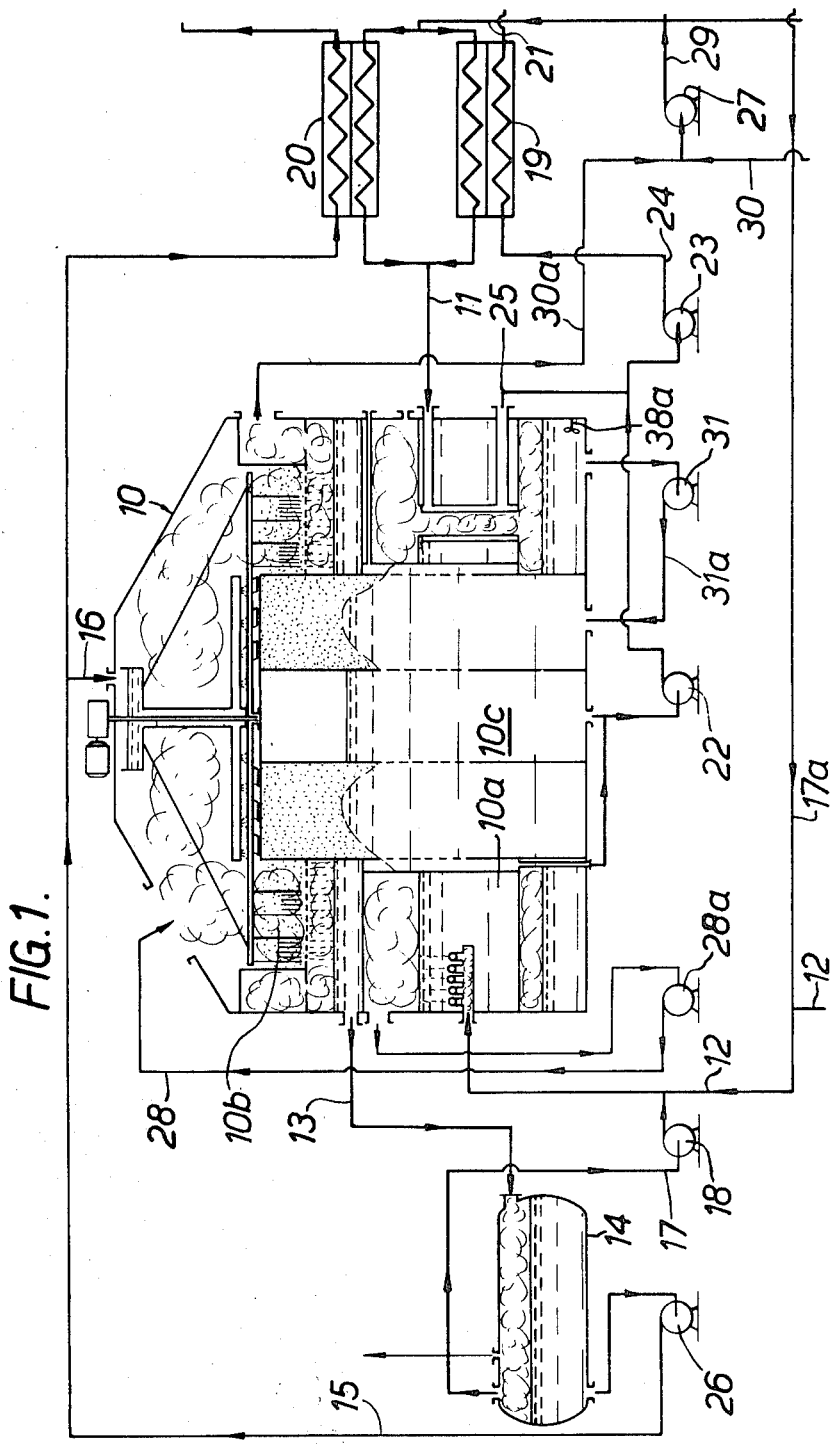
FIG. 1 is mainly a flow circuit diagram.

FIG. 1 shows a unit 10 which is described in more detail hereinafter with reference to FIGS. 2 and 3. The unit 10 contains a crystallizer section 10a, a melter section 10b and a brine separator and ice crystal washer section 10c. Details are omitted of these and other items which, though used in plant for reducing the impurity content of impure water by the immiscible refrigerant freeze process, are not appropriate to a flow circuit diagram. In the diagram impure water, in this example saline water, is fed to the unit 10 along a line 11. Immiscible refrigerant (in the present example liquified butane gas) is passed to the unit along a line 12 from a conventional pressurized storage vessel (not shown). Fresh water output from the unit, which normally contains a proportion of liquid butane refrigerant, passes from the unit 10 via a line 13 to a primary decanter 14. In the decanter fresh water and the liquid refrigerant (which is immiscible with water) separate and the resulting fresh water passes on to a condenser/decanter (not shown) via a line 15 from which a bleed of fresh water is taken to return to the unit 10 along a line 16. This bleed serves in the unit 10 to wash ice crystals formed in the unit as will be hereinafter described. Liquid refrigerant separated in the decanter 14 is pumped along a line 17 by a pump 18 to join the line 12 and is supplemented by liquid butane from the condenser/decanter via a line 17a.

The sea water line 11 is supplied by the paralleled outputs of spent brine heat exchanger 19 and fresh water heat exchanger 20. Both heat exchangers 19, 20 are fed by a common sea water intake line 21 which is supplied from a sea water intake screening unit (not shown). The spent brine heat exchanger 19 effects precooling of incoming sea water by heat exchange with low temperature spent brine from the unit 10 driven by pumps 22, 23 along a line 24. A fraction of the spent brine is returned to the unit 10 from the line 24 along a line 25. The fresh water heat exchanger 20 effects precooling of incoming sea water by heat exchange with low temperature fresh water driven along the line 15 by a pump 26.

The butane vapor evolved in the crystallizer section 10a of the unit 10 is passed via a duct 28 and by a blower 28a to the melter section 10b by way of the roof portion of the unit 10. This butane vapor condenses in the melter section 10b and leaves as a mixture with the melted ice via the line 13 to the primary decanter 14. Butane vapor from a debutanizer (not shown) in a line 30 joins a line 30a taking uncondensed butane vapor from the melter section 10b and the combined flow is passed by a blower 27 via a line 29 to said condenser/decanter. Ice slurry from the crystallizer section 10a is passed to the brine separator and ice crystal washer section 10c of the unit 10 by a pump 31 along the line 31a.

Figure 2:
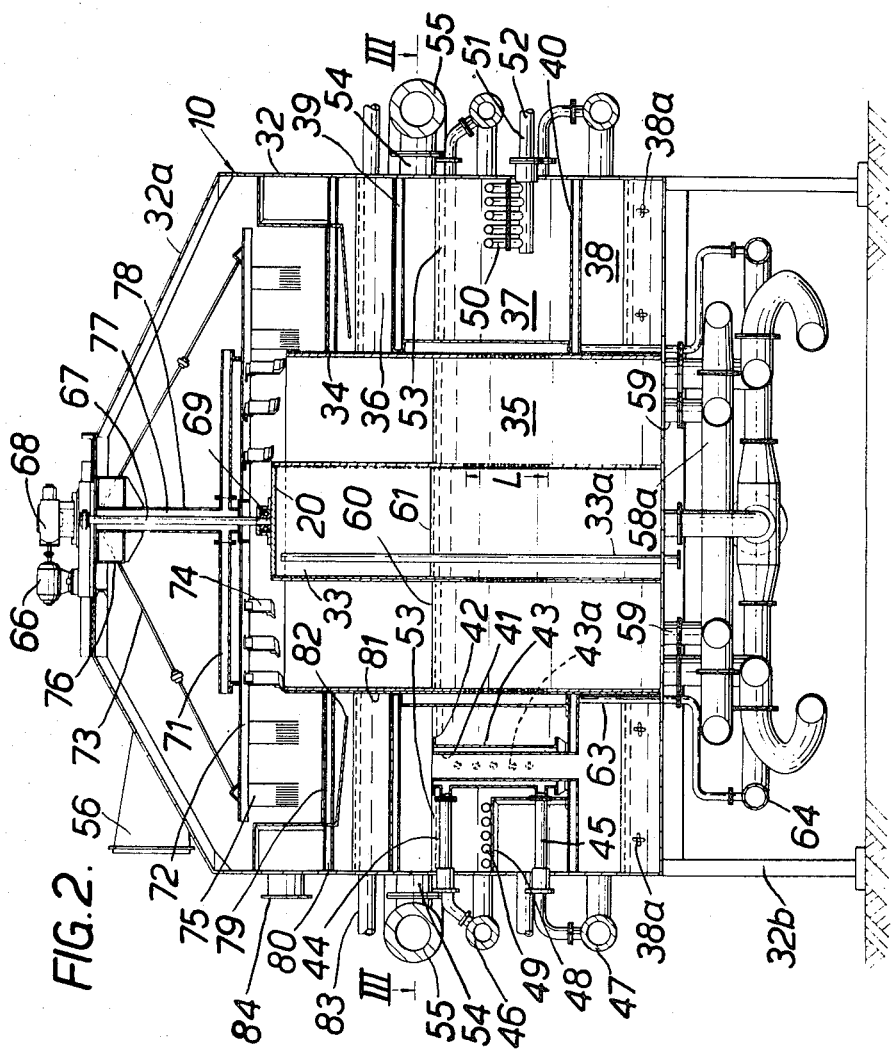
FIG. 2 is a side view in medial section of apparatus embodying the invention.
Figure 3:
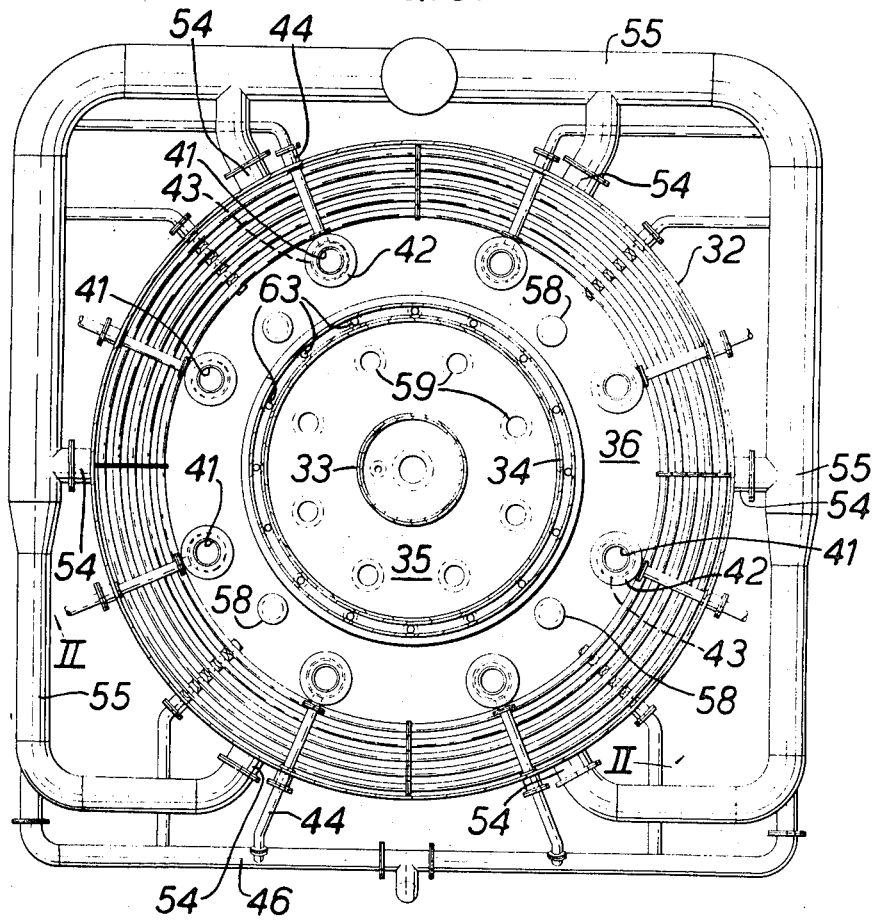
FIG. 3 is a plan view in section on line III—III of FIG. 2.

The unit 10 is now considered in more detail with reference to FIGS. 2 and 3. The unit 10 is housed in a vessel 32 having a frustroconical roof 32a. The base of the vessel 32 is supported clear of the ground on reinforced concrete supports 32b which enables pipework and pumps to be mounted beneath the vessel. Within the vessel 32 is provided a central tubular chamber 33 with its axis vertical and concentric with the axis of the vessel 32. The chamber 33 provides a channel for spent brine and has a butane vapor relief line 33a connecting with the line 29 (see FIG. 1, the connection however is not shown in FIG. 1). Concentric with the chamber 33 and disposed between the wall of the chamber 33 and the wall of the vessel 32 is a cylindrical partition 34, which defines separating and washing column 35 (section 10c of FIG. 1), and an annular space 36 containing the melter section (10b of FIG. 1) and the crystallizer section (generally 10a in FIG. 1).

The crystallizer section has a first sub-section forming an injection zone 37 and a second sub-section forming a disengagement zone 38. The injection zone 37 comprises an annular chamber enclosed between an upper deck 39 and a lower deck 40 in the space 36. Symmetrically spaced around this annular chamber and supported on the lower deck 40 are eight overflow ducts constituted by standpipes 41 having sills 42. Each standpipe 41 penetrates the deck 40 and communicates with the disengagement zone 38. Furthermore each standpipe is surrounded by a jacket 43 to the upper end of which incoming sea water is fed by pipe 44, recirculated brine being fed to the lower end of each jacket 43 by a pipe 45. From the jacket 43 the incoming sea water and brine are passed into the injection zone 37 by jet outlets 43a in the jacket wall. The tangential direction of the outlets 43a ensures that the mass of liquid in the injection zone 37 is moved in an annular direction as well as being agitated. Pipes 44 and 45 are linked respectively to ring mains 46 and 47. The ring main 47 is fed with recirculated brine by way of the line 25 (FIG. 1). The ring main 46 receives incoming sea water via the line 11 (FIG. 1).

Within the injection zone 37 trestles 48 support five liquid refrigerant ring mains 49. The mains 49 are fed by manifolds 50 which are coupled in turn to a ring main 52 by pipes 51. The ring main 52 is fed by the line 12 (FIG. 1). The mains 49 have apertures in their upper sides whereby liquid butane is injected into the mass of sea water. The liquid/crystal (slurry) level 53 is governed by the height of the standpipes 41, and the fact that warmer intake sea water is introduced at the upper end of the jackets 43 ensures that the standpipes 41 do not become clogged by slurry. Butane vapor, evolved in the injection zone 37 and passing to the space above the level 53, is withdrawn by way of ducts 54 to a vapor main 55. The main 55 is linked to the duct 28 (FIG. 1) which allows vapor to be driven by the blower 28a back into the spaced defined by the roof 32a through an inlet 56 (FIG. 2).

Ice slurry passes to the disengagement zone 38 via the standpipes 41 under gravity, and therein is agitated by paddles 38a which not only assist in causing vaporization of any butane droplets carried over from the injection zone 37, but also serve to provide good distribution of the ice crystals in the mother liquor. Residence of the slurry in the disengagement zone 38 also allows the ice crystals to grow to an optimum size.

A slurry pump 31 (FIG. 1, not shown in FIGS. 2 and 3) is mounted beneath the vessel 32 so that ice slurry in the disengagement zone 38 can be withdrawn, after a predetermined residence time governed by desired crystal growth, via outlets 58 (FIG. 3) four of which are symmetrically disposed about the axis of the annular space 36. The slurry leaving the outlets 58 is passed by means of the pump 31 through ducting 58a, corresponding to line 31a (FIG. 1), to enter the column 35 at its lower end through inlets 59 of which eight are shown symmetrically disposed about the axis of the column 35. Ice carried into the column 35 being less dense than saline water rises towards the saline level 60 in the column 35. This level 60 is an approximate indication only since ice in crystalline or coalesced form eventually fills the major part of the column 35. The wall of the chamber 33 is apertured over the length L to allow liquid to flow between the column 35 and the chamber 33. Level 61 in this zone represents the working level for saline water. The barrier 34 is also apertured over a length at the same height as that of the length L so that liquid from column 35 can pass into a jacket 62 located in, but separate from, the crystallizer sub-section 37 between the upper deck 39 and lower deck 40. Water in the jacket 62 is drained from the jacket by way of sixteen downcomers 63 symmetrically disposed about the barrier 34. The downcomers 63 open into a ring main 64 which feeds the pump 22 (FIG. 1).

The upper part of the frustro-conical roof 32a of the vessel 32 provides a mounting for an electric motor 66 which drives a shaft 67 through a reduction gearing 68. The lower end of shaft 67 is located by a bearing 69 mounted on a beam 70 fitted across the upper end of the chamber 33. Mounted to revolve with the shaft 67 are four spray bars 71 (only two being shown) spaced symmetrically about the shaft 67, and four ice plough bars 72 (only two being shown). The outer end of each plough bar is supported by a tie rod 73. Each plough bar 72 is provided with three scrapers 74 which are angled to scrape ice at the upper end of the column 35 outwardly into the upper part of the annular space 36. The section of each plough bar extending over the annular space 36 is provided with a pair of spreaders 75.

Wash water for feeding to the spray bars 71 is fed from the line 16 (FIG. 1) into a circular section tank 76 mounted on, and adapted to rotate with the shaft 67. The tank 76 contains a constant head overflow 77 formed by the upper end of a duct 78 which serves to carry water from the tank 76 to the spray bars 71.

The upper part of the annular space 36 (that is to say the part above upper deck 39) contains the melting section of the unit 10. The section includes a strainer 79 mounted on beams 80 on which ice, swept outwardly from the column 35 by means of plough bars 72, is deposited. The space between the strainer 79 and the upper deck 39 comprises a fresh water collecting tank 81 and includes a baffle 82 for increasing the flow path for water flowing through the strainer 79 into the tank 81. Fresh water is withdrawn from the tank 81 by way of an outlet 83 to enter the fresh water line 13 (FIG. 1). Vaporized refrigerant within the tank 81 is drawn off by way of an outlet 84 to pass via the line 30a (FIG. 1) to the condenser/decanter (not shown).

The described apparatus which is particularly pertinent to the invention is intended to operate as follows, the description referring to FIGS. 2 and 3, that is to say, to the unit 10 shown in FIG. 1. The operation of the remaining items of FIG. 1 are not further considered since they are used in a manner conventional to the present process.

Screened sea water is fed via the ring main 46 along the pipes 44 into the injection zone 37 of the crystallizer section by way of the jackets 43 and the jets 43a. Water passing into the injection zone 37 from the jets 43a urges the water already in the injection zone to pass around its annular shape and to cause overflow of slurry into the disengagement zone 38 of the crystallizer section. Liquid butane is injected into the circulating mass of water in the injection zone 37 by way of the mains 49 in a manner which induces a rotational component into the annular movement of the water, the combined components providing a helical flow pattern along the annulus of the zone 37. The pressure in the injection zone 37 is maintained at such a level that the butane boils off obtaining the necessary latent heat from the sea water with which it is in intimate contact. This removal of heat from the water results in the formation of ice crystals. The helical flow pattern of the water mass induced by the water feed through the jets 43a and the boiling butane serves to improve the ice crystal formation. The resulting slurry of ice crystals in saline water floating at the level 53 floods over the sills 42 of the standpipes 41 and falls into the disengagement zone 38 which is maintained at a similar low pressure to that in the injection zone 37. The paddles 38a in addition to their functions of assisting in the evaporation of any butane droplets carried over from the injection zone 37 and ensuring good ice crystals distribution, also serve to impart a degree of circulator movement to the growing ice crystals in the disengagement zone 38. The residence time of the ice crystals in the disengagement zone is chosen to give optimum growth of crystals. The rate of flow of slurry into the disengagement zone 38 depends on the rate of sea water imput to the injection zone 37. The saline slurry is withdrawn from the bottom of the disengagement zone 38 through the ducts 58 and the line 31a (FIG. 1) by means of the slurry pump 31 (FIG. 1) and is then pumped into the column 35 by way of the inlets 59.

In the column 35 an ice bed is formed which is urged upwardly (as further crystals are fed in by way of the inlets 59) until the bed contacts scrapers 74 on the plough bars 72 which are maintained in continuous rotation by the motor 66 driving the shaft 67. The continuous spray of fresh water provided from the tank 76 by way of the spray bars 71 serves to wash saline water on the ice back down the column 35. As a consequence of this, ice reaching the scrapers 74 is saline free and is scraped from the piston and swept over onto the strainer 79 positioned in the upper part of the annular space 36. Butane vapor returned to the roof portion of the vessel 32 by way of the inlet 56 is free to contact ice on the strainer 79 which is agitated to expose fresh contact surface by the spreaders 75 on the outer ends of plough bars 72. By virtue of this contact process, the vapor releases its latent heat to the ice, and the vapor condenses to form butane liquid. The released latent heat serves to melt the ice on the strainer which passes as water droplets through the strainer 79 into the fresh water collecting tank 81 after dropping onto the baffle 82. The mixed fresh water and liquid butane is withdrawn from the tank 81 via the outlet 83 and the line 13 (FIG. 1) and passed to the primary decanter 14 (FIG. 1). Uncondensed butane vapor in the tank 81 is withdrawn via the outlet 84 and the line 30a (FIG. 1).

Figure 4:
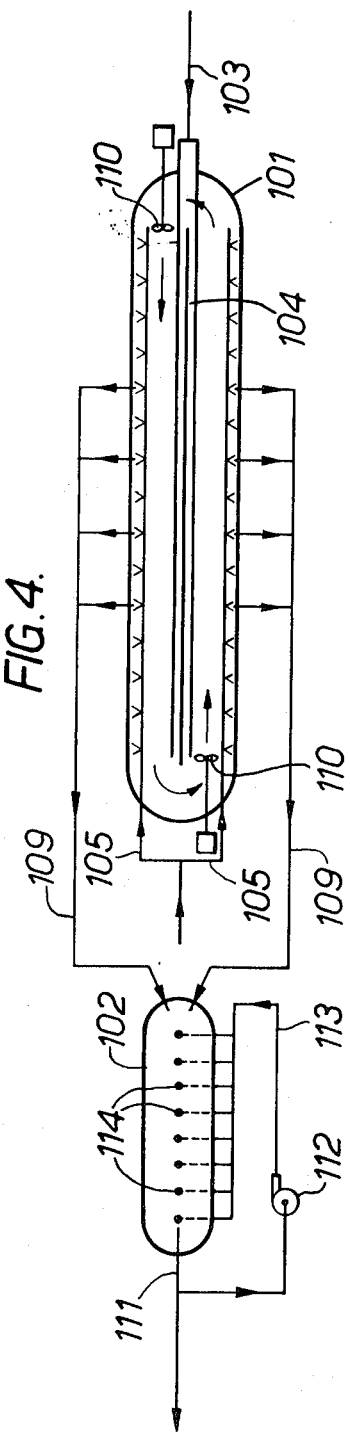
FIG. 4 is a plan view of a second embodiment.
Figure 5:
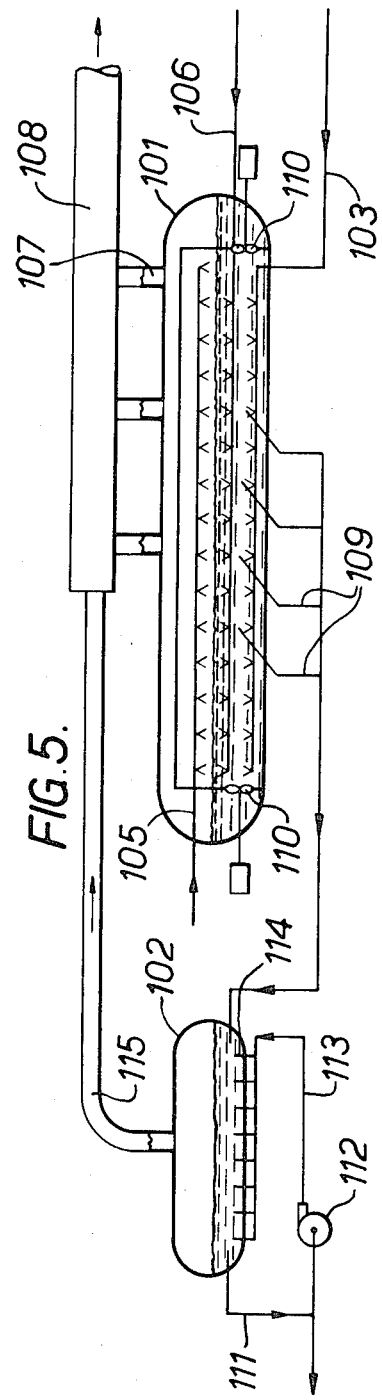
FIG. 5 is a side view of the embodiment of FIG. 4.

In an alternative embodiment of which the crystallizer section is shown diagrammatially in FIGS. 4 and 5 the sections making up the unit 10 in the previously described embodiment are housed separately. Further the sub-sections of the crystallizer section are each in a distinct vessel.

As shown in FIGS. 4 and 5 the crystallizer section comprises a primary vessel 101 forming the first sub-section or injection zone and a secondary vessel 102 forming the second sub-section or disengagement zone. The vessels are cylindrical and arranged with their main axes horizontal. Saline water is introduced into the primary vessel 101 from pipes 103 situated in the lower half of the vessel on both sides of a central baffle 104. Recirculated brine is introduced from pipes 105 running the length of the primary vessel — and positioned above the surface of slurry (ice crystals in brine) in the vessel. The pipes 105 have nozzles attached to spray the recirculated brine on to the walls of the vessel and on to the central baffle 104 to prevent build up of ice in these regions. Liquid butane is sprayed into the vessel 101 from a series of parallel pipes 106 immersed in the slurry and arranged to distribute butane throughout the slurry. Gaseous butane is removed from the top of the vessel 101 via a series of ducts 107 manifolded into a single large diameter duct 108 which interconnects with a gaseous butane extract duct 115 from the secondary vessel 102. Transfer of slurry from the vessel 101 to the vessel 102 is by gravity through manifolded pipes 109. Agitators 110 of the propellor type are provided at each end of the vessel 101 to maintain circulation of the slurry. Some agitation of the slurry in the vessel 102 is derived from evaporation of residual butane in the slurry which flows into one end of the vessel 102 from the manifolded pipes 109 and leaves through a pipe 111 at the other end of the vessel, the flow approaching plug flow. To increase the agitation however about half the slurry leaving the vessel 102 is recirculated (by means of a pump 112) along a line 113 to jets 114. The jets 114 provide a high local velocity which induces a vertical circulation pattern, turning over the contents of the vessel 102 and permitting liquid butane to be brought sufficiently close to the surface for evaporation to take place. Agitation also keeps the ice in suspension and acts to reslurry it if for any reason it floats to the surface. A preferred position for the jets 114 is along the bottom center line of the vessel, pointing to the sides, the jets being raised slightly from the bottom and angled so that the emerging liquid is tangential to the bottom.

We claim

1. In a plant for reducing the impurity content of impure water by an immiscible refrigerant freeze process and including a crystallizer section for producing ice crystals in the impure water by boiling the immiscible refrigerant therein, the improvement wherein: said crystallizer includes first and second sub-sections, said first sub-section forming an injection zone, said second sub-section forming a disengagement zone for removal of droplets of refrigerant entrained in ice slurry introduced into said disengagement zone from said injection zone; means for introducing said impure water into said injection zone only of said crystallizer section; means for injecting immiscible refrigerant into the impure water in said injection zone, means for transferring the ice crystal slurry produced in said injection zone into said disengagement zone; means for removing refrigerant vapor from said injection zone; and means for removing refrigerant vapor from said disengagement section.

2. Plant according to claim 1 including means for maintaining said injection and disengagement sections at the same pressure.

3. Plant as claimed in claim 1 wherein a brine separator and ice crystal washing section is housed in the same vessel as the crystallizer section.

4. Plant as claimed in claim 3 wherein the crystallizer section is contained in an annulus surrounding the brine separator and ice crystal washing section.

5. Plant as claimed in claim 3 wherein a melter section is also housed in the same vessel as the crystallizer section.

6. Plant as claimed in claim 1 wherein the first sub-section and the second sub-section are in separate vessels.

7. Plant as claimed in claim 6 wherein the separate vessels are cylindrical and each arranged with the major axes horizontal.

8. Plant as claimed in claim 1 wherein agitator means are provided in the second sub-section to assist in removing entrained droplets of refrigerant from the ice crystal slurry.

9. Plant as claimed in claim 8 wherein the agitator means comprises jets produced by recirculation of ice crystal slurry to the second sub-section.

10. Plant as claimed in claim 1 wherein the first sub-section is constructed to provide a continuous circular flow path for the ice crystal slurry produced therein.

11. Plant as claimed in claim 10 wherein means are provided for inducing in the first sub-section a flow pattern which includes at least a component of flow along said flowpath.

12. Plant as claimed in claim 11 wherein said flow-inducing means is provided by the means for feeding impure water to the first sub-section.

* * * * *

Disclaimer 3,712,075.—*Michael John Stapley Smith*, Boars Hill, *John Henry Wilson*, Stockport, *Byran Reginald Parr*, Sale, England. APPARATUS FOR PERFORMING THE IMMISCIBLE REFRIGERANT FREEZE PROCESS FOR PURIFYING WATER. Patent dated Jan. 23, 1973. Disclaimer filed Aug. 9, 1973, by the assignee, *United Kingdom Atomic Energy Authority*.

Hereby enters this disclaimer to claims 1, 6, 10, 11 and 12 of said patent.

[*Official Gazette September 11, 1973.*]